United States Patent Office 3,153,339
Patented Oct. 20, 1964

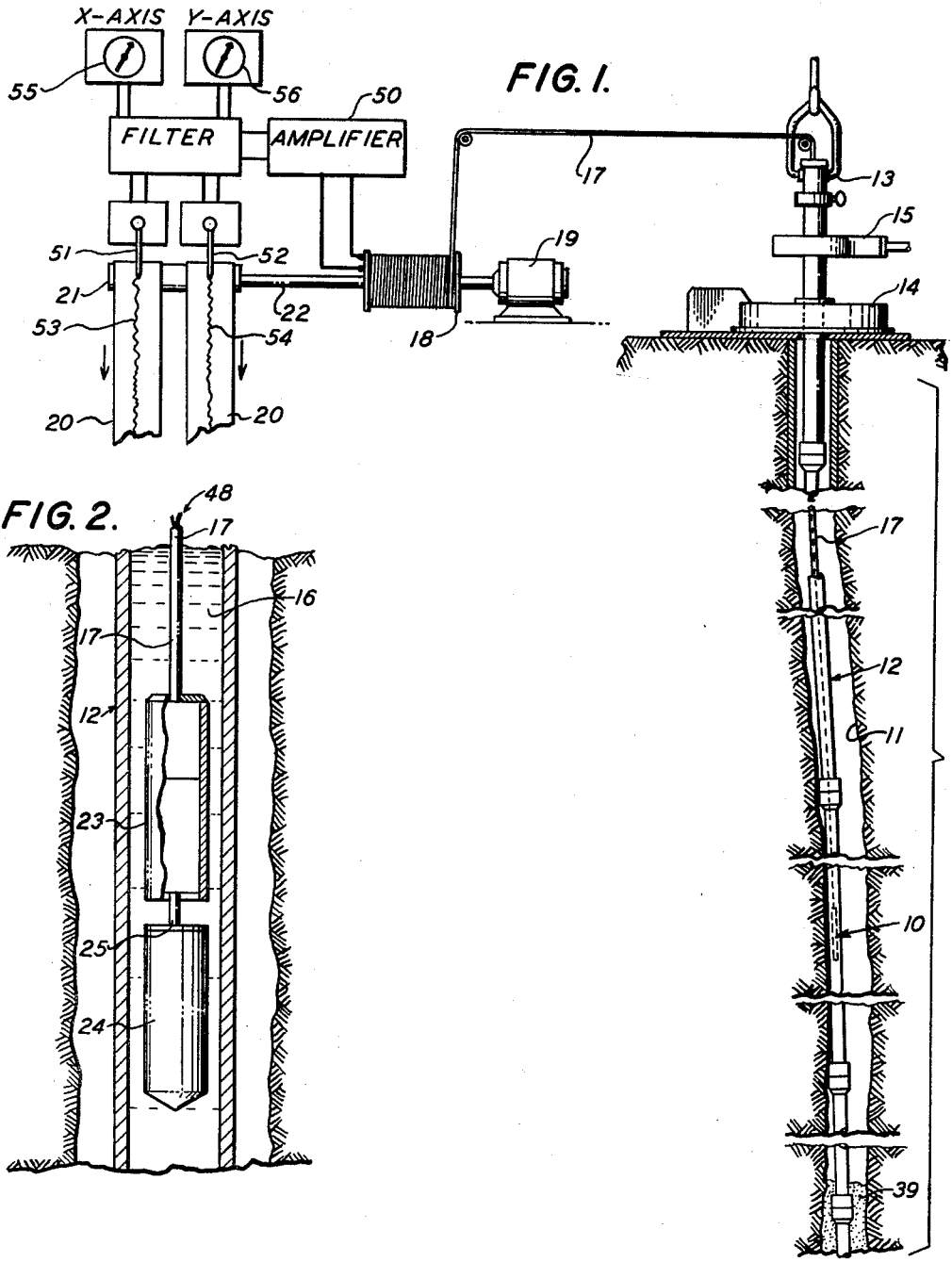

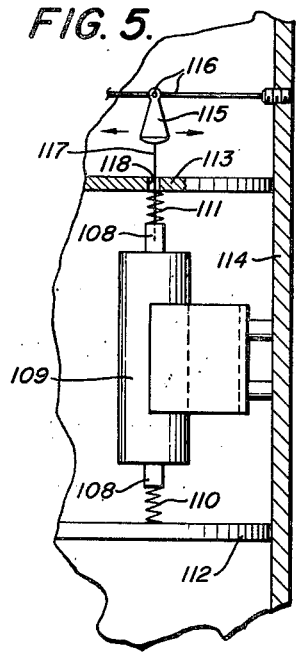
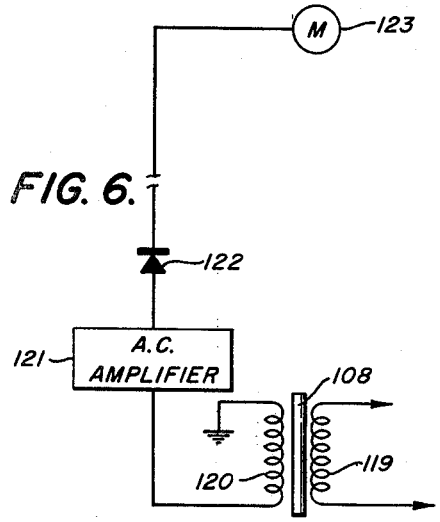
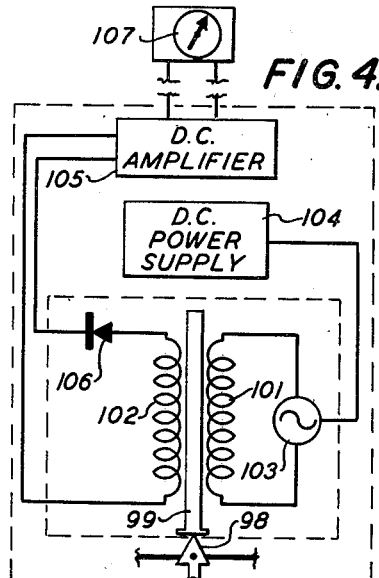
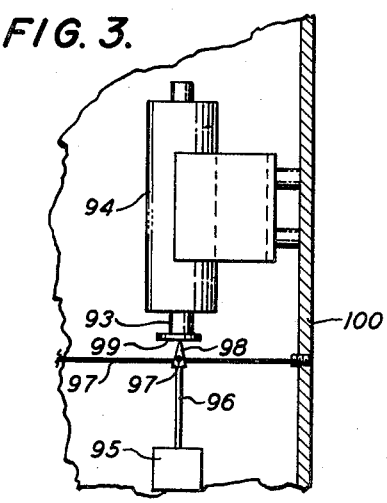

3,153,339
APPARATUS FOR SENSING WELL PIPE
MOVEMENT
Ford I. Alexander, 340 Arbolada Drive, Arcadia, Calif.,
and Ira C. Bechtold, La Habra, Calif.; said Bechtold
assignor to said Alexander
Filed Apr. 17, 1961, Ser. No. 103,518
1 Claim. (Cl. 73—151)

This invention relates generally to the determination of the depth or depths at which pipe is movable in a well relative to the surrounding formation. More particularly, the invention concerns novel apparatus for determining at what depth pipe is stuck or immovable in a well, in order that the pipe sections above the stuck point location may be recovered through the use of suitable recovery apparatus.

In well drilling, it frequently happens that the drill string may become stuck at locations that may range from depths near the bit to intermediate depths many pipe stand lengths above the bit, depending upon conditions encountered in a particular well being drilled and the particular reason for the pipe becoming lodged. To illustrate, the pipe may become stuck as a result of a cave-in, wedging by loose objects in the well, or by key seating of pipe in crooked holes. Also, well casing may become stuck in the hole.

In keeping with one of the presently prevailing practices, the determination of the stuck point location is made by attaching a strain sensitive device in the nature of a strain gauge to spaced apart portions of the pipe in the well. When the pipe is thereafter strained, the strain sensitive apparatus will register strain at locations above the stuck point, but will fail to register strain if the apparatus is attached to the pipe below the stuck point, thereby determining the stuck joint location. The process of taking the strain readings is made lengthy and time consuming by the necessity of attaching the apparatus to the pipe at different elevations, and therefore the determination of the stuck point location by presently known apparatus is expensive and not as efficient as desirable.

The present invention has for its general object to provide improved apparatus whereby the stuck point location may be rapidly determined by detecting pipe movement at determinable depths in the well, such detection being made possible without requiring attachment of the detector apparatus to the pipe. As a direct result, continuous readings or determinations of pipe movement are possible as the detector is lowered or elevated in the pipe, and in general at locations above the stuck point pipe movement will be detectable, whereas no such movement of the pipe will occur below the stuck point and therefore will not be discernible by the apparatus to be described.

Such improved apparatus broadly comprises detector means having parts relatively movable to effect production of a signal in response to displacement of the detector means housing which remains freely suspended within the pipe, together with means for freely suspending the detector apparatus at determinable depths within the well pipe so that the detector is subject to displacement in response to displacement transmitted from the pipe through the fluid to the detector means. More particularly, the detector means includes a housing, electromagnetically intercoupled coil and probe parts and means for electrically energizing the coil part. Also, the detector means includes motion coupling means permitting one of said parts to move relative to the other part in response to slight displacement of the detector means freely suspended in the pipe, all in such manner as to change the electromagnetic intercoupling of the coil and probe parts for producing a signal.

As will be brought out, the motion coupling means is highly sensitive so that the slightest motion of the pipe transmitted through the fluid to the detector means is operable through the coupling means to effect relative movement of the coil and probe parts, and therefore the detector means need not be attached to the pipe in order to produce relative motion between the coil and probe parts.

Other objects and advantages of the invention include the provision of electrical apparatus in association with the coil and probe parts for energizing the coil, such apparatus including a direct current source and means to convert direct current to alternating current for application to the coil. Also, such electrical apparatus may include means for converting the alternating current signal from the coil to direct current, and for amplifying the resultant direct current signal, these components being associated with the detector apparatus or alternatively located at the well head, as will be explained. Finally, the invention contemplates particularly advantageous motion coupling devices for assuring relative movement of the coil and probe parts in response to transmission of pipe movement through the fluid within the pipe to the detector apparatus, the contemplated devices including a pendulum operatively connected with the probe part, and highly flexible and elongated supports connected to the probe part in such manner as to allow movement thereof relative to the coil in response to the slightest movement of the pipe.

These and other objects and advantages of the present invention, as well as the details of an illustrative embodiment, will be more fully understood from the following detailed description of the drawings, in which:

FIG. 1 is a general view showing the detection apparatus run down in a well for detection of pipe movement;

FIG. 2 is an enlarged view showing the interior of the detection instrument;

FIG. 3 is a view showing a vertically oriented probe together with a motion coupling device;

FIG. 4 is a circuit diagram showing the coil and probe of FIG. 8 together with means for energizing the coil, and means for rectifying and amplifying the coil signal for transmission to the well head;

FIG. 5 is a vertical elevation showing a modified motion coupling means operatively connected with a vertically oriented probe; and FIG. 6 is a circuit diagram showing the coil and probe parts of the FIG. 5 apparatus, together with means for amplifying and rectifying the coil signal at the detector location.

Referring first to FIG. 1, the carrier body for the detector is shown generally at 10 run down into the crooked well open hole 11 within a standard drill pipe string 12 suspended by a conventionally illustrated elevator 13. The surface equipment is shown to include also a rotary table 14 and tongs 15 either or both of which may be used in rotating and torsionally winding the drill string, as and for the purposes later described. Likewise, the elevator 13 may be used in lifting and lowering the drill string to transmit accelerating displacement to the drill string in the hole.

The carrier body 10 is suspended in the drill string, and typically within fluid such as drilling mud contained therein as indicated at 16 in FIG. 2, by means of a line or a cable 17 which may be raised or lowered by means of a drum 18 on which the cable is wound. The drum is rotated typically by means of a reversible motor or power unit 19, and readings as to the depth of the carrier body 10 in the hole are obtainable off a chart or charts 20 driven in synchronism with the drum 18 through a strip drum 21 on which the charts 20 are wound and to which the drum 18 is connected as by shaft 22. Broadly speaking, the invention contemplates the use of any means for recording the carrier depth and for synchronizing the record drive with the travel of the carrier 10 in the well.

Turning to FIG. 2 the carrier body 10 is shown to comprise upper and lower housings 23 and 24 interconnected at 25 and suspended by the cable 17 within the pipe 12. FIG. 3 shows a probe 93 vertically oriented for vertical displacement within coil housing 94 mounted within detector housing 24. The inertial and motion coupling means in FIG. 3 comprises a pendulum 95 supported for swinging movement by a stem 96 and flexible cross supports or wires 97, together with a high-rate cam 98 bearing against the underside of the probe extension at 99. Any pipe movement transmitted to the detector housing 24 will result in swinging of the pendulum 95 relative to the housing and vertical displacement of the probe 93. The latter is shown in the circuit diagram of FIG. 4 as cooperating with input and output coils 101 and 102, the former being energized by the A.C. generator 103 which is supplied from a power supply 104, the output coil 102 being connected with a D.C. amplifier 105 through a rectifier 106. The resultant amplified direct current signal is then transmitted to well surface for recording at 107. The circuit elements 103 through 106 of FIG. 4 may be contained within the upper housing 23 of FIG. 2.

Finally, referring to FIG. 5, a vertically oriented probe 108 received within the coil housing 109 is supported between a pair of highly flexible springs 110 and 111 which are confined between the cross pieces 112 and 113 within the detector housing 114. The inertial and motion coupling means shown includes a pendulum 115 supported by cross wires 116, together with a flexible line 117 connected with the pendulum and extending downwardly through an opening 118 in the cross piece or diaphragm 113 to the probe upper end. Any displacement transmitted from the pipe through the fluid to the housing 114 will result in swinging the pendulum 115 relative to the housing and vertical displacement of the probe. The latter is shown in the circuit diagram of FIG. 6 cooperating with input and output coils 119 and 120. The signal from the coil 120 is amplified at 121 and then rectified at 122 for transmission to the well head and recording the upper detector housing 23 of FIG. 2.

The signal transmitted to the ground surface through the cable 17 may be subjected to further amplification as by the amplifier 50 in FIG. 1. The amplified X-axis and Y-axis signals may then be recorded as by movement of stylii 51 and 52 producing records 53 and 54 on the depth charts 20 as the latter are driven by the motor 19. Thus, the presence of pipe transverse displacement at known depth in the well may be instantly determined by visual inspection of the charts 20 and the records produced thereon. Furthermore, a rapid survey of the movability of the pipe at known depths in the hole may be accomplished merely by lowering the carrier 10 in the pipe and displacing the pipe at the well head to transmit motion to the pipe within the well above the stuck point, such displacement being either rotative or vertical as by lifting or lowering the pipe. Recordings will then be made on the charts 20 to indicate the depth at which the pipe is moving, and when the point is reached below which the pipe no longer moves, it is assured that the stuck point has been found. Other visual recorders are indicated at 55 and 56 in FIG. 1, for producing auxiliary visual indications of pipe transverse displacement.

In connection with the foregoing, it will be understood that bottomed pipe on which weight is added sags in the well toward the long side of the hole, whereas an upward pull on pipe carries it to the short side of the hole. Sections of pipe are thus displaced transversely in the hole, as is fluid in the pipe, in response to elevation and lowering of the pipe at the well head. However, transverse movement of the pipe at the stuck point cannot occur, so the pipe and fluid at and below the stuck point cannot be accelerated transversely. In addition, rotation of the pipe at the well head, with the pipe bottomed and weight added, results in the transverse acceleration of pipe and fluid therein in the hole.

We claim:

Apparatus for determining at what depths pipe is movable in a non-vertical well relative to the surrounding formation, the pipe containing flowable material, said apparatus comprising detector means including a housing, said detector means having parts including electromagnetically intercoupled coil and probe parts and means for electrically energizing said coil part, at least one of said parts comprising a transversely floating inertia part and said detector means including motion coupling means permitting one of said coil and probe parts to move relative to the other of said coil and probe parts in response to slight transverse displacement of the detector housing remaining freely suspended in said pipe thereby to change said electromagnetic intercoupling of the coil and probe parts in such manner as to produce a signal, said inertia part being movable transversely relative to the housing, and means for freely suspending said detector means at determinable depths within the well pipe so that said detector means is subject to displacement in response to displacement transmitted from the pipe through the fluid to said detector means, said probe part being movable relative to the coil generally lengthwise relative to the coil axis, and said inertia part and coupling means including a pendulum and a flexible line for moving the probe part in response to slight displacement of the pendulum relative to the detector housing.

References Cited in the file of this patent
UNITED STATES PATENTS 2,698,920     Gieske  ---------------- Jan. 4, 1955
2,716,890     Martin  ---------------- Sept. 6, 1955